(12) United States Patent
Chang et al.

(10) Patent No.: US 8,471,409 B2
(45) Date of Patent: Jun. 25, 2013

(54) POWER CONVERSION CIRCUIT

(75) Inventors: Jin-Ming Chang, Kwei Shan Township, Taoyuan County (TW); Zhan-Yi Lin, Kwei Shan Township, Taoyuan County (TW); Chen-Kun Chou, Kwei Shan Township, Taoyuan County (TW); Yu-Ming Sun, Kwei Shan Township, Taoyuan County (TW); Chi-Bin Wu, Kwei Shan Township, Taoyuan County (TW)

(73) Assignee: Chung-Hsin Electric and Machinery Manufacturing Corp., Jhonghe, Taipei County (TW)

( * ) Notice: Subject to any disclaimer, the term of this patent is extended or adjusted under 35 U.S.C. 154(b) by 359 days.

(21) Appl. No.: 13/036,406

(22) Filed: Feb. 28, 2011

(65) Prior Publication Data
US 2012/0170336 A1    Jul. 5, 2012

(30) Foreign Application Priority Data
Dec. 29, 2010    (TW) .............................. 99146468 A (51) Int. Cl.
*H02M 7/537*    (2006.01)

(52) U.S. Cl.
USPC ................ 307/87; 363/79; 363/95; 323/266; 323/906

(58) Field of Classification Search
USPC ................ 323/906, 266; 363/79, 95; 307/87
See application file for complete search history.

(56) References Cited

U.S. PATENT DOCUMENTS

| | | | | |
|---|---|---|---|---|
| 6,058,035 A | * | 5/2000 | Madenokouji et al. | 363/95 |
| 8,018,748 B2 | * | 9/2011 | Leonard | 363/95 |
| 8,189,352 B2 | * | 5/2012 | Egiziano et al. | 363/35 |

* cited by examiner

*Primary Examiner* — Harry Behm
(74) *Attorney, Agent, or Firm* — Stites & Harbison PLLC; Juan Carlos A. Marquez, Esq.

(57) ABSTRACT

The present invention discloses a power conversion circuit. A control module controls a pulse width modulation regulator to regulate a duty cycle of a DC-DC converter according to the direct current link voltage of the DC-DC converter and the output current and voltage of a renewable power supply. The control module also controls the pulse width modulation regulator to regulate a duty cycle of a DC-AC inverter according to the direct current link voltage of the DC-DC converter, output voltage of a utility power supply, and the output current and voltage of the renewable power supply.

7 Claims, 8 Drawing Sheets

POWER CONVERSION CIRCUIT

BACKGROUND OF THE INVENTION

1. Technical Field

The present invention relates to grid connection technology, and more particularly, to a power conversion circuit for use in a grid-connected renewable power system.

2. Description of Related Art

In theory, renewable energy is energy which comes from natural resources and is inexhaustible, such as solar power, wind power, geothermal energy, hydropower, tidal power, or biomass energy, which are derived from energy that originates in the nature. It is an important industrial development policy of technologically advanced countries to strike a balance between power generation and environmental protection, so as for human beings to achieve sustainable development on the Earth, by converting renewable energy into daily electric power efficiently and economically.

Grid connection technology plays an important role in a green renewable power system. With grid connection technology, once the power generated by a renewable power supply is not sufficient for a load, or in case of a failure of the renewable power supply, a utility power supply will start to supply power to the load. If the power generated by the renewable power supply is not sufficient for the load and thus the utility power supply has to supply power to supplement the required power, the frequency and phase of the output voltage of a converter between the renewable power supply and the utility power supply will be necessarily consistent with that of the grid power. Also, any surplus power supplied by the renewable power supply when the power requirement of the load is met will be fed back to the power plant.

Figure 1:
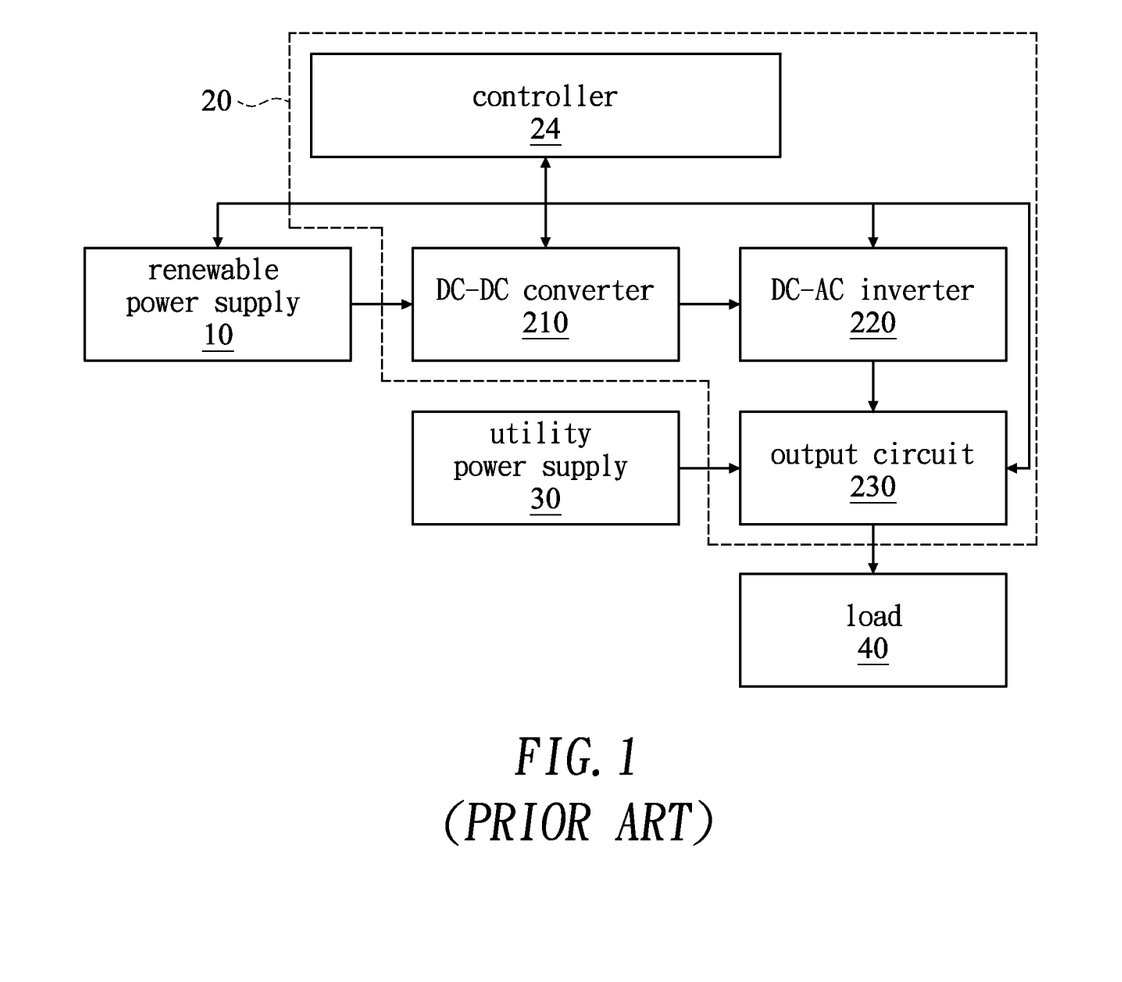
FIG. 1 is a rough structural schematic view of a conventional grid-connected renewable power system.

Referring to FIG. 1, there is shown a rough structural schematic view of a conventional grid-connected renewable power system.

Referring to FIG. 1, a conventional grid-connected renewable power system comprises a renewable power supply 10, a power conversion circuit 20, a utility power supply 30, and a load 40.

The power conversion circuit 20 comprises a controller 24, a DC-DC converter 210, a DC-AC inverter 220, and an output circuit 230.

The DC-DC converter 210 receives renewable power generated by the renewable power supply 10 and converts the received renewable power into stable and constant direct current (DC) power. The DC-AC inverter 220 converts the DC power from the DC-DC converter 210 into alternating current (AC) power. The controller 24 controls the operation of the renewable power supply 10, the DC-DC converter 210, the DC-AC inverter 220, and the output circuit 230. Under the control of the controller 24, the output circuit 230 supplies the AC power and/or the grid power to the load 40.

With grid connection technology, the detected angular position of the AC power from the DC-AC inverter 220 and the detected angular position of a grid power serve as a key index to the efficiency thereof. Conventional angular position detection technology is based on a zero-detection circuit and a digital phase-locked loop. However, the zero-detection circuit incurs costs and is susceptible to interference to the detriment of the accuracy in angular position measurement. Although the digital phase-locked loop is advantageously characterized by short response time and high precision, it is difficult to design a controller for use with a digital phase-locked loop.

SUMMARY OF THE INVENTION

The present invention relates to a power conversion circuit characterized by a DC-DC converter operating under the control of a current closed circuit and a DC-AC inverter operating under the control of an outer-loop voltage closed circuit and an inner-loop current closed circuit, so as to greatly reduce the volume of the related circuits of hardware.

The present invention relates to a power conversion circuit for use in a renewable power system in a second-order series-connected manner.

The present invention relates to a power conversion circuit, wherein a DC-DC converter is controlled by a current closed circuit, and the level of power generation handled by a DC-DC converter is controlled by feeding back output current and output voltage of a renewable power supply and the direct current link voltage.

The present invention relates to a power conversion circuit, wherein a DC-AC inverter is characterized in that the direct current link voltage is controllably stabilized by feeding back the direct current link voltage, and problems with system control design are reduced by d-q-axis rotor coordinates transformation.

The present invention relates to a power conversion circuit, wherein a DC-AC inverter is characterized in that the direct current link voltage is regulated by the power compensation control inputted such that, in response to an instantaneous change in a load, the direct current link voltage outputted is unlikely to undergo any great change, thereby enhancing the stability of the direct current link voltage.

The present invention relates to a power conversion circuit, wherein a DC-AC inverter is characterized in that the angular position of a grid power voltage is detected so as to ensure that the output voltage of the DC-AC inverter can be synchronized with a grid power.

In order to achieve the above and other objectives, the present invention provides a power conversion circuit, comprising: a first receiving end electrically connected to a renewable power supply; a second receiving end for receiving a grid power; a load end for electrical connection with a load; a DC-DC converter having an input end electrically connected to the first receiving end to thereby convert output voltage of the renewable power supply into a stable direct current link voltage according to a duty cycle of a first modulation signal; a DC-AC inverter having an input end electrically connected to an output end of the DC-DC converter to thereby receive the direct current link voltage and convert the direct current link voltage into an alternating current link voltage according to a duty cycle of a second modulation signal; an output circuit electrically connected to an output end of the DC-AC inverter, the second receiving end, and the load end so as to supply one of the alternating current link voltage and the grid power to the load; a feedback circuit electrically connected to the first receiving end, the output end of the DC-DC converter, the output end of the DC-AC inverter, and the second receiving end so as to feed back a first feedback signal corresponding to the output voltage of the renewable power supply, a second feedback signal corresponding to an output current of the renewable power supply, a third feedback signal corresponding to the direct current link voltage of the DC-DC converter, a fourth feedback signal corresponding to an output current of the DC-AC inverter, and a fifth feedback signal corresponding to the output voltage of the grid power; a detecting circuit electrically connected to the feedback circuit for receiving the fifth feedback signal and performing computation according to the fifth feedback signal so as to obtain an angular position of the grid power; a control module electrically connected to the feedback circuit and the detecting circuit for converting expression of the fourth feedback signal and the fifth feedback signal in terms of two-axis stator coordinates into expression of the fourth feedback signal and the fifth feedback signal in terms of rotor coordinates according to the angular position, outputting a first control signal according to the first feedback signal, the second feedback signal, and the third feedback signal, and outputting a second control signal according to the first feedback signal, the second feedback signal, the third feedback signal, and the fourth feedback signal and the fifth feedback signal which are expressed in terms of the rotor coordinates; and a pulse width modulation regulator electrically connected to the control module for outputting the first modulation signal according to the first control signal and outputting the second modulation signal according to the second control signal.

Implementation of the present invention involves at least the following inventive steps:

1. Reducing the volume of a circuit of hardware greatly by digital circuit design.
2. Controlling the level of power generation handled by a DC-DC converter by feeding back output current and output voltage of the renewable power supply and the direct current link voltage.
3. Controlling the stability of the direct current link voltage by feeding back the direct current link voltage.
4. With d-q-axis coordinate transformation, a time-varying control factor is converted into a time-invariant control factor in order to perform control, such that the command of a system is easier to follow, thereby reducing control-related and design-related problems of the system.
5. The direct current link voltage is regulated by means of the inputted power compensation control, so as to enhance its stability and therefore effectively improve a system transient state.
6. The angular position of a grid power can be precisely detected and calculated, so as to ensure that the output voltage of the DC-AC inverter can be synchronized with the grid power.

Detailed features and advantages of the present invention are described in detail in the embodiments to allow persons skilled in the art to understand the technical contents of the present invention and implement the present invention accordingly. Persons skilled in the art can readily understand related objectives and advantages of the present invention according to the disclosure in this specification, the claims, and the drawings.

DETAILED DESCRIPTION OF THE INVENTION

Figure 2:
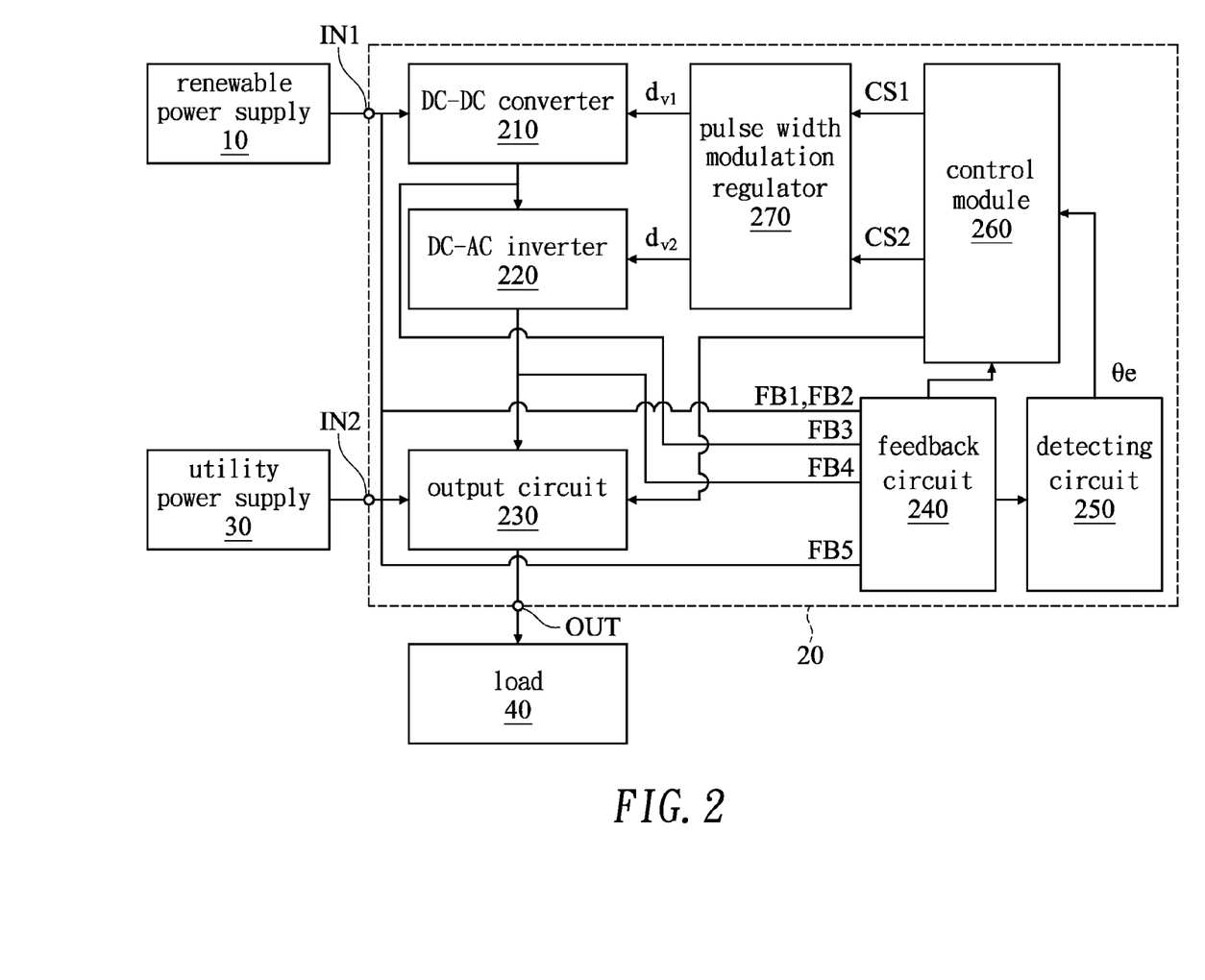
FIG. 2 is a rough structural schematic view of a power conversion circuit according to an embodiment of the present invention.

Referring to FIG. 2, a power conversion circuit 20 comprises a first receiving end IN1, a second receiving end IN2, a load end OUT, a DC-DC converter 210, a DC-AC inverter 220, an output circuit 230, a feedback circuit 240, a detecting circuit 250, a control module 260, and a pulse width modulation regulator 270.

The first receiving end IN1 is electrically connected to a renewable power supply 10, so as to receive renewable power generated by the renewable power supply 10. The renewable power supply 10 can be a fuel cell, but this feature should not limit the present invention.

The second receiving end IN2 is electrically connected to a supply end of the utility power supply 30, so as to receive a grid power from the supply end of the utility power supply 30.

The load end OUT is electrically connected to the load 40 and configured to supply power to the load 40.

The input end of the DC-DC converter 210 is electrically connected to the first receiving end IN1, and the output end of the DC-DC converter 210 is electrically connected to the input end of the DC-AC inverter 220. The output end of the DC-AC inverter 220 is electrically connected to the output circuit 230. Also, the output circuit 230 is further electrically connected to the second receiving end IN2 and the load end OUT.

The feedback circuit 240 is electrically connected to the first receiving end IN1, the output end of the DC-DC converter 210, the output end of the DC-AC inverter 220, and the second receiving end IN2. The detecting circuit 250 is electrically connected between the feedback circuit 240 and the control module 260. The control module 260 is electrically connected to the feedback circuit 240. The pulse width modulation regulator 270 is electrically connected between the controlling end of the DC-DC converter 210 and the control module 260, and is electrically connected between the controlling end of the DC-AC inverter 220 and the control module 260.

The renewable power received by the first receiving end IN1 is voltage-boosted by the DC-DC converter 210 and thus converted into stable and constant direct current (DC) power, and then the stable and constant DC power is outputted to the DC-AC inverter 220. In this regard, according to a duty cycle of a first modulation signal, the DC-DC converter 210 converts the output voltage supplied by the renewable power supply 10 and received by the first receiving end IN1 into a stable direct current link voltage.

The DC-AC inverter 220 receives the direct current link voltage generated by the DC-DC converter 210, and converts the received direct current link voltage into an alternating current link voltage, according to a duty cycle of a second modulation signal.

Under normal conditions, the output circuit 230 electrically connects the DC-AC inverter 220 and the load end OUT, such that the alternating current link voltage generated by the DC-AC inverter 220 is supplied to the load 40 via the load end OUT. Hence, if the alternating current link voltage outputted from the DC-AC inverter 220 is sufficient for the load 40, the output circuit 230 will sever the electrical connection between the second receiving end IN2 and the load end OUT. If the alternating current link voltage outputted from the DC-AC inverter 220 is insufficient for the load 40, the output circuit 230 will electrically connect the second receiving end IN2 and the load end OUT, so as to supply a grid power to the load 40.

As mentioned above, there is a scenario where the alternating current link voltage outputted from the DC-AC inverter 220 is insufficient for the load 40; however, the grid power can only cover the deficit. Hence, if the alternating current link voltage outputted from the DC-AC inverter 220 is insufficient for the load 40, the alternating current link voltage outputted from the DC-AC inverter 220 and the grid power can share the electrical power demand of the load 40. However, this feature should not limit the present invention. Alternatively, if the alternating current link voltage outputted from the DC-AC inverter 220 is insufficient for the load 40, the grid power alone can meet the electrical power demand of the load 40, by enabling the electrical connection between the second receiving end IN2 and the load end OUT and disabling the electrical connection between the DC-AC inverter 220 and the load end OUT. Also, it is feasible for the output circuit 230 to comprise a relay.

The feedback circuit 240 can retrieve the input of the first receiving end IN1, the output of the DC-DC converter 210, the output of the DC-AC inverter 220, and the input of the second receiving end IN2, feed back a first feedback signal FB1 of the output voltage of the renewable power supply 10, a second feedback signal FB2 of the output current of the renewable power supply 10, a third feedback signal FB3 of the direct current link voltage of the DC-DC converter 210, a fourth feedback signal FB4 of the output current of the DC-AC inverter 220, and a fifth feedback signal FB5 of the output voltage of the grid power of the utility power supply 30 to the control module 260, and feed back the fifth feedback signal FB5 of the output voltage of the grid power of the utility power supply 30 to the detecting circuit 250.

Figure 3:
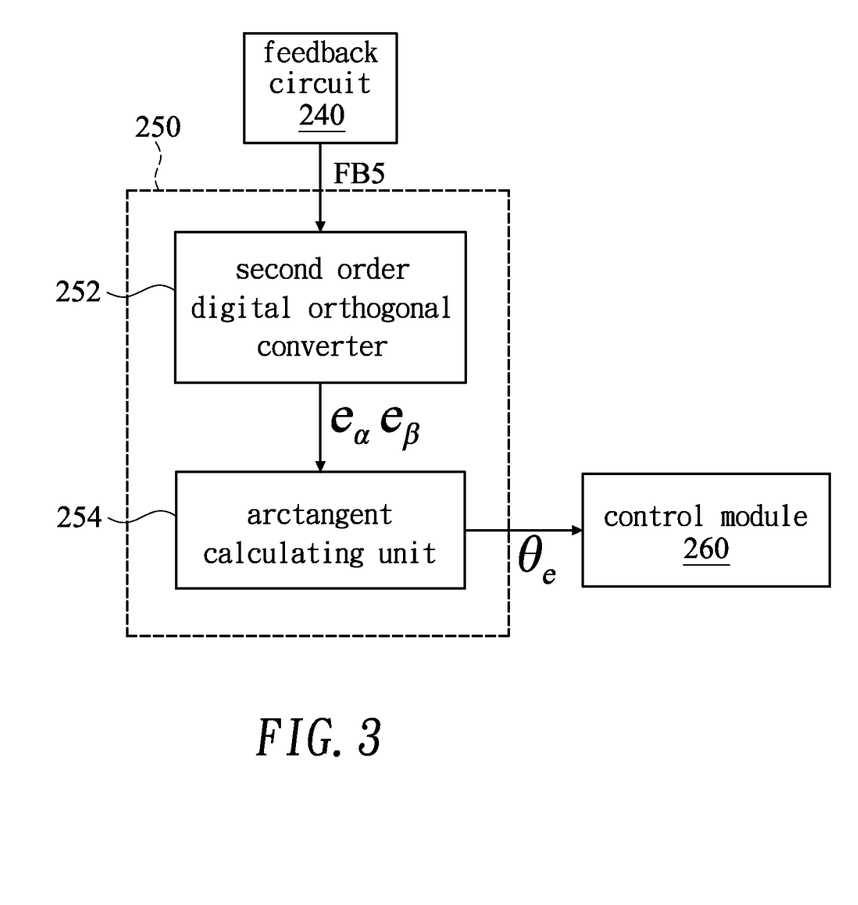
FIG. 3 is a rough structural schematic view of a detecting circuit according to an embodiment of the present invention.

Referring to FIG. 3, there is shown a rough structural schematic view of the detecting circuit 250 according to an embodiment of the present invention. As shown in FIG. 3, the detecting circuit 250 operates in accordance with the fifth feedback signal FB5 to obtain an angular position $\theta_e$ of the grid power. The detecting circuit 250 comprises a second order digital orthogonal converter 252 and an arctangent calculating unit 254.

The second order digital orthogonal converter 252 is electrically connected between the feedback circuit 240 and the arctangent calculating unit 254. The arctangent calculating unit 254 is electrically connected between the second order digital orthogonal converter 252 and the control module 260.

The second order digital orthogonal converter 252 receives the fifth feedback signal FB5 derived from the output voltage of the grid power of the utility power supply 30 and fed back by the feedback circuit 240 and generates, according to the fifth feedback signal FB5, sine waves $e_\alpha$, $e_\beta$ which are synchronized with the grid power. Afterward, the arctangent calculating unit 254 calculates the angular position $\theta_e$ of the grid power according to the sine waves $e_\alpha$, $e_\beta$ which are synchronized with the grid power, and outputs the angular position $\theta_e$ thus calculated to the control module 260. Furthermore, the arctangent calculating unit 254 calculates the angular position $\theta_e$ of the grid power by calculating tangent and arctangent functions of the sine waves $e_\alpha$, $e_\beta$ which are synchronized with the grid power. The sine waves $e_\alpha$, $e_\beta$ are orthogonal to each other, that is, forming an included angle of 90°.

Figure 4:
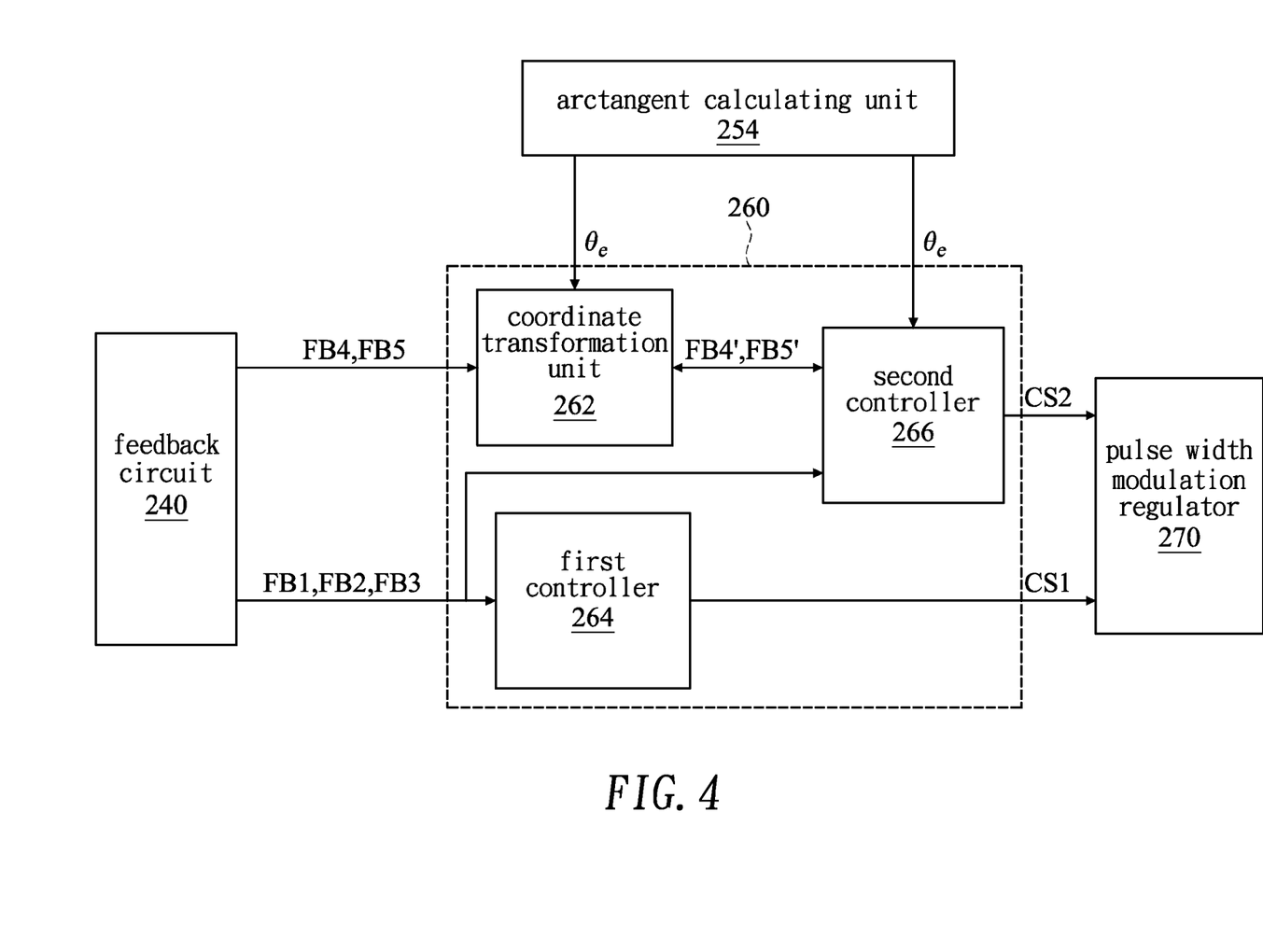
FIG. 4 is a rough structural schematic view of a control module according to an embodiment of the present invention.

Referring to FIG. 4, the control module 260 outputs a first control signal CS1 according to the first feedback signal FB1, the second feedback signal FB2, and the third feedback signal FB3. Furthermore, the control module 260 converts expression of the fourth feedback signal FB4 and the fifth feedback signal FB5 in terms of two-axis stator coordinates into expression of the fourth feedback signal FB4' and the fifth feedback signal FB5' in terms of rotor coordinates according to the angular position $\theta_e$, and outputs a second control signal CS2 according to the first feedback signal FB1, the second feedback signal FB2, the third feedback signal FB3, a fourth feedback signal FB4' expressed in terms of rotor coordinates, and a fifth feedback signal FB5' expressed in terms of rotor coordinates.

The control module 260 comprises a coordinate transformation unit 262 and two controllers. The two controllers are hereinafter referred to as a first controller 264 and a second controller 266 for the sake of clear description.

The input end of the coordinate transformation unit 262 is electrically connected to the feedback circuit 240 and the arctangent calculating unit 254 of the detecting circuit 250. The input end of the first controller 264 is electrically connected to the feedback circuit 240. The output end of the first controller 264 is electrically connected to the pulse width modulation regulator 270. Hence, the first controller 264 is electrically connected between the feedback circuit 240 and the pulse width modulation regulator 270. The input end of the second controller 266 is electrically connected to the feedback circuit 240, the arctangent calculating unit 254 of the detecting circuit 250, and the coordinate transformation unit 262. The output end of the second controller 266 is electrically connected to the pulse width modulation regulator 270.

The first controller 264 controls the pulse width modulation regulator 270 according to the first feedback signal FB1 of the output voltage of the renewable power supply 10, the second feedback signal FB2 of the output current of the renewable power supply 10, and the third feedback signal FB3 of the direct current link voltage of the DC-DC converter 210, so as for the DC-DC converter 210 to output the stable and constant DC power. Furthermore, the first controller 264 calculates the first control signal CS1 according to the first feedback signal FB1 of the output voltage of the renewable power supply 10, the second feedback signal FB2 of the output current of the renewable power supply 10, and the third feedback signal FB3 of the direct current link voltage of the DC-DC converter 210, and outputs the first control signal CS1 to the pulse width modulation regulator 270. Hence, the pulse width modulation regulator 270 outputs a first modulation signal $d_{v1}$ according to the first control signal CS1, so as for the DC-DC converter 210 to output the stable and constant DC power according to the duty cycle of the first modulation signal $d_{v1}$.

The coordinate transformation unit 262 receives the angular position $\theta_e$, (of the grid power) calculated by the arctangent calculating unit 254, and converts expression of the fourth feedback signal FB4 and the fifth feedback signal FB5 in terms of two-axis stator coordinates ($\alpha$-$\beta$-axis coordinates) into expression of the fourth feedback signal FB4' and the fifth feedback signal FB5' in terms of rotor coordinates (d-q-axis coordinates) according to the received angular position $\theta_e$.

The second controller 266 receives the first feedback signal FB1, the second feedback signal FB2, the third feedback signal FB3, the fourth feedback signal FB4' and the fifth feedback signal FB5' which are expressed in terms of rotor coordinates, and the angular position $\theta_e$, and controls the pulse width modulation regulator 270 according to the received feedback signals (i.e., the first feedback signal FB1, the second feedback signal FB2, the third feedback signal FB3, as well as the fourth feedback signal FB4' and the fifth feedback signal FB5' which are expressed in terms of rotor coordinates) and the angular position $\theta_e$, such that the DC-AC inverter 220 outputs alternating current which is synchronized with the grid power in frequency. Furthermore, the second controller 266 calculates the second control signal CS2 according to the first feedback signal FB1, the second feedback signal FB2, the third feedback signal FB3, the fourth feedback signal FB4' and the fifth feedback signal FB5' which are expressed in terms of rotor coordinates, and the angular position $\theta_e$, and outputs the second control signal CS2 to the pulse width modulation regulator 270. Hence, the pulse width modulation regulator 270 outputs a second modulation signal $d_{v2}$ according to the second control signal CS2, such that the DC-AC inverter 220 outputs alternating current which is synchronized with the grid power in frequency according to the duty cycle of the second modulation signal $d_{v2}$.

The control module 260 can further comprise a controller for controlling the switching of the output circuit 230 according to the electrical power demand of the load 40. Also, the control module 260 further controls the switching of the output circuit 230 according to the electrical power demand of the load 40. The control of the switching of the output circuit 230 by the control module 260 is well understood by persons skilled in the art and thus is not described herein in detail for the sake of brevity.

As shown in FIG. 2, the pulse width modulation regulator 270 outputs the first modulation signal $d_{v1}$ according to the first control signal CS1, so as to regulate the duty cycle of the DC-DC converter 210. Also, the pulse width modulation regulator 270 outputs the second modulation signal $d_{v2}$ according to the second control signal CS2, so as to regulate the duty cycle of the DC-AC inverter 220.

Figure 5:
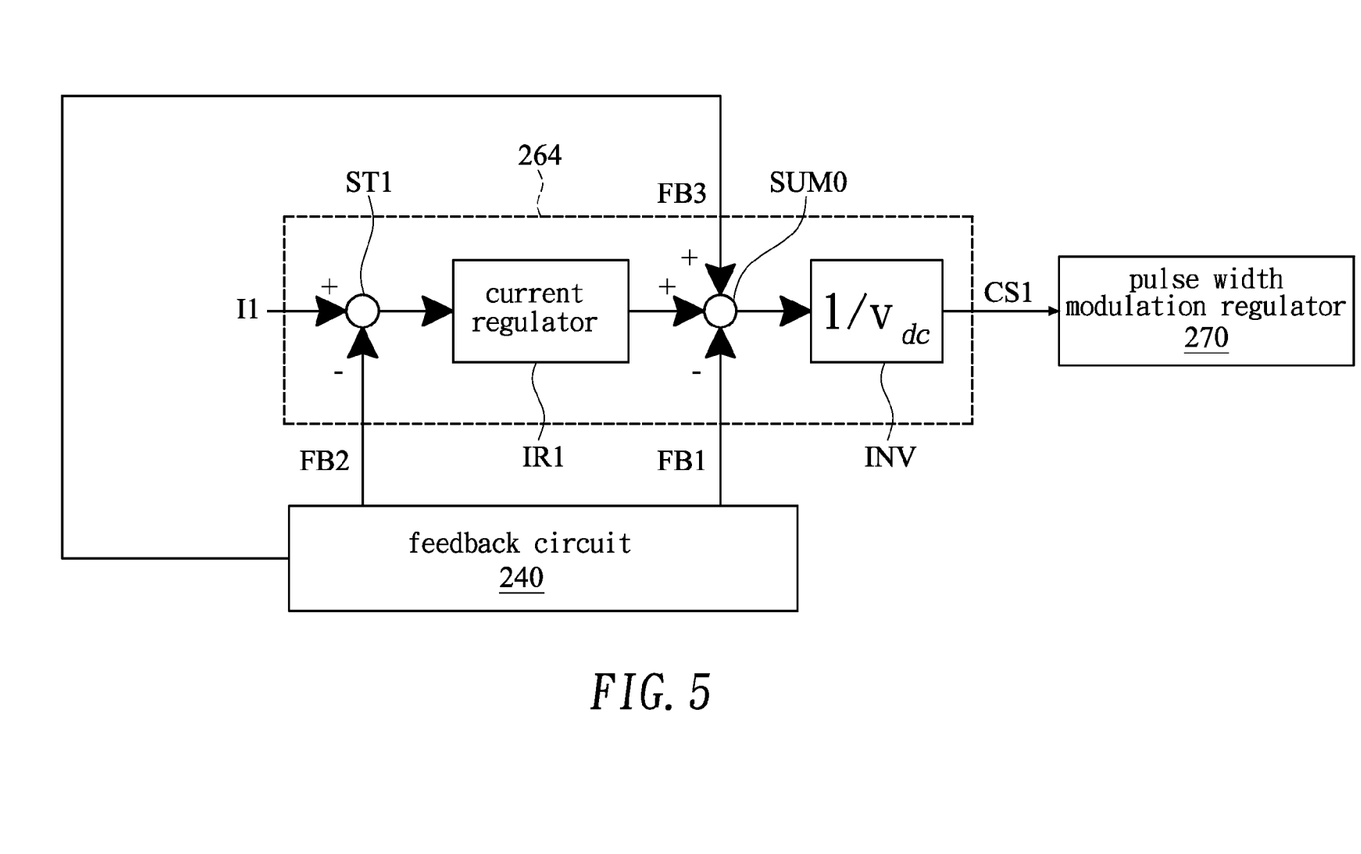
FIG. 5 is a rough structural schematic view of a first controller according to an embodiment of the present invention.

Referring to FIG. 5, there is shown a rough structural schematic view of the first controller 264 according to an embodiment of the present invention.

As shown in FIG. 5, the first controller 264 comprises a subtractor ST1, a current regulator IR1, an accumulator SUM0, and a reciprocator INV.

The positive input end of the subtractor ST1 is electrically connected to a first supplying unit (not shown), and the negative input end of the subtractor ST1 is electrically connected to the feedback circuit 240. The current regulator IR1 is electrically connected to the output end of the subtractor ST1 and a first positive input end of the accumulator SUM0. A second positive input end and the negative input end of the accumulator SUM0 are electrically connected to the feedback circuit 240, and the output end of the accumulator SUM0 is electrically connected to the input end of the reciprocator INV. Also, the output end of the reciprocator INV is electrically connected to the pulse width modulation regulator 270.

The first supplying unit supplies a preset current command value I1 to the subtractor ST1. The subtractor ST1 calculates the difference between the received current command value I1 and the second feedback signal FB2, and sends the difference to the current regulator IR1. Then, the current regulator IR1 regulates an output value (i.e., the difference between the current command value I1 and the second feedback signal FB2) of the subtractor ST1, and outputs the regulated output value to the accumulator SUM0. In this regard, the current regulator IR1 amplifies an error of the input current (i.e., the output current of renewable power supply). The accumulator SUM0 calculates the sum of an output value of the current regulator IR1 and the third feedback signal FB3, subtracts the first feedback signal FB1 from the sum, and sends the difference to the reciprocator INV. Afterward, the reciprocator INV converts the third feedback signal FB3 into a reciprocal according to an output value of the accumulator SUM0, so as to generate and send the first control signal CS1 to the pulse width modulation regulator 270. In this regard, the reciprocator INV performs inversion computation to achieve multifold reduction in the direct current link voltage of the DC-DC converter 210, so as to unitize the direct current link voltage of the DC-DC converter 210.

Figure 6:
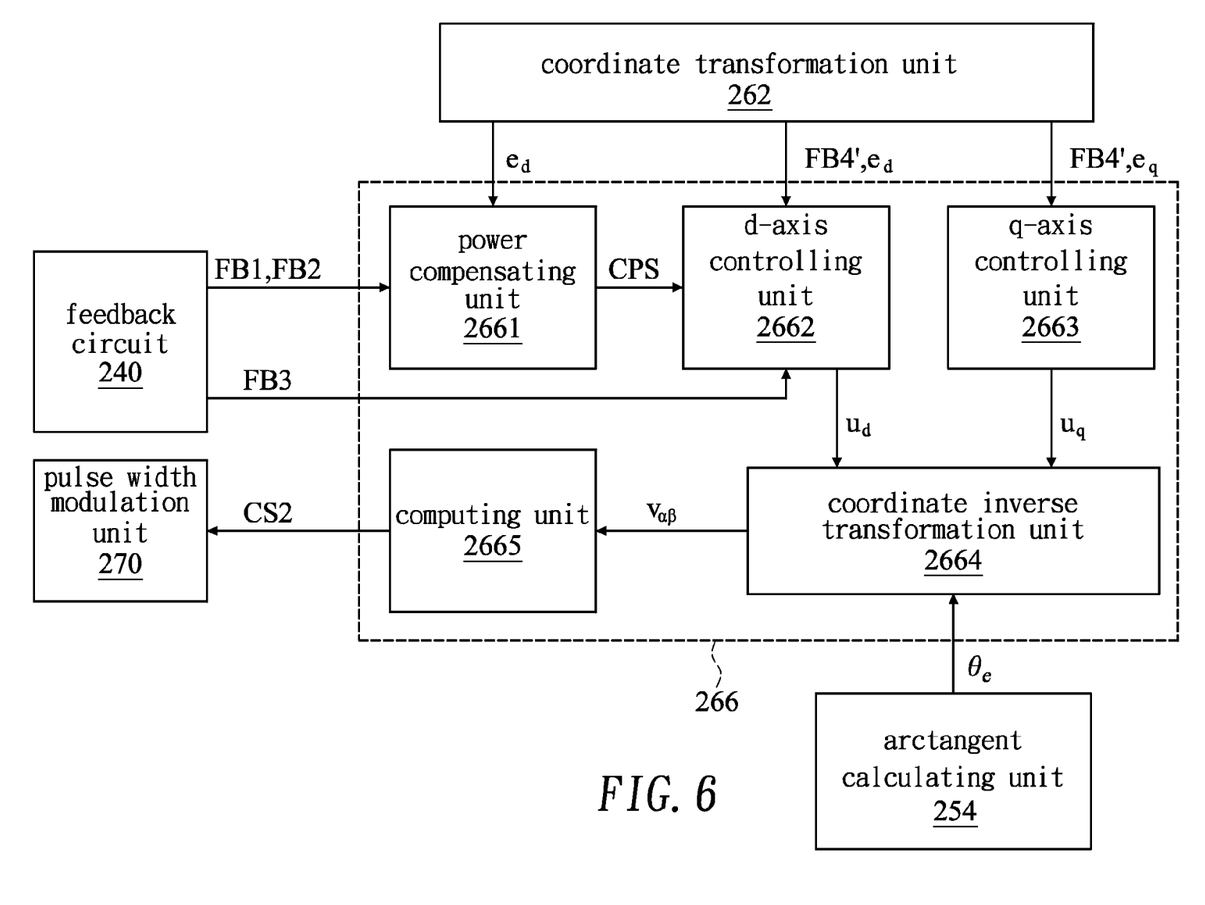
FIG. 6 is a rough structural schematic view of a second controller according to an embodiment of the present invention.

Referring to FIG. 6, there is shown a rough structural schematic view of the second controller 266 according to an embodiment of the present invention.

As shown in FIG. 6, the second controller 266 comprises a power compensating unit 2661, a d-axis controlling unit 2662, a q-axis controlling unit 2663, a coordinate inverse transformation unit 2664, and a computing unit 2665.

The power compensating unit 2661 is electrically connected to the feedback circuit 240, the coordinate transformation unit 262, and the d-axis controlling unit 2662. The d-axis controlling unit 2662 is further electrically connected to the feedback circuit 240, the coordinate transformation unit 262, and the coordinate inverse transformation unit 2664. The q-axis controlling unit 2663 is electrically connected to the coordinate transformation unit 262 and the coordinate inverse transformation unit 2664. The coordinate inverse transformation unit 2664 is further electrically connected to the arctangent calculating unit 254 of the detecting circuit 250 and the computing unit 2665. Also, the computing unit 2665 is electrically connected between the coordinate inverse transformation unit 2664 and the pulse width modulation regulator 270.

The fifth feedback signal FB5 which is expressed in terms of rotor coordinates comprises a q-axis fifth feedback signal $e_q$ (i.e., rotor coordinates denote the quadrature-axis component of the fifth feedback signal) and a d-axis fifth feedback signal $e_d$ (i.e., rotor coordinates denote the direct-axis component of the fifth feedback signal).

The power compensating unit 2661 generates and sends an input compensation value CPS to the d-axis controlling unit 2662 according to the first feedback signal FB1, the second feedback signal FB2, and the d-axis fifth feedback signal $e_d$. Afterward, the d-axis controlling unit 2662 generates and sends a d-axis controlling command $\mu_d$ to the coordinate inverse transformation unit 2664, according to the third feedback signal FB3, the input compensation value CPS, the fourth feedback signal FB4' expressed in terms of rotor coordinates, and the d-axis fifth feedback signal $e_d$. The q-axis controlling unit 2663 generates and sends a q-axis controlling command $\mu_q$ to the coordinate inverse transformation unit 2664 according to the fourth feedback signal FB4' expressed in terms of rotor coordinates and the q-axis fifth feedback signal $e_q$. Afterward, the coordinate inverse transformation unit 2664 converts expression of the d-axis controlling command $\mu_d$ and the q-axis controlling command $\mu_q$ in terms of rotor coordinates into expression of the d-axis controlling command $\mu_d$ and the q-axis controlling command $\mu_q$ in terms of two-axis stator coordinates according to the angular position $\theta_e$, so as to generate a controlling command $v_{\alpha\beta}$ expressed in terms of two-axis stator coordinates. The computing unit 2665 receives the controlling command $v_{\alpha\beta}$ expressed in terms of two-axis stator coordinates, and performs computation on the controlling command $v_{\alpha\beta}$ expressed in terms of two-axis stator coordinates so as to generate and send the second control signal CS2 to the pulse width modulation regulator 270.

The power compensating unit 2661 executes the following computation expression: $2 \times FB1 \times FB2 \div e_d$ (Expression 1), and the result of computation of Expression 1 equals the input compensation value CPS.

The controlling command $v_{\alpha\beta}$ expressed in terms of two-axis stator coordinates comprises an α-axis controlling command $v_\alpha$ and a β-axis controlling command $v_\beta$. The computing unit 2665 executes the computation expression (Expression 2) according to the α-axis controlling command $v_\alpha$ and the β-axis controlling command $v_\beta$, and the result of computation of Expression 2 equals the second control signal CS2.

Also, the fourth feedback signal FB4' expressed in terms of rotor coordinates comprises a q-axis fourth feedback signal $i_q$ (i.e., rotor coordinates denote the quadrature-axis component of the fourth feedback signal) and a d-axis fourth feedback signal $i_d$ (i.e., rotor coordinates denote the direct-axis component of the fourth feedback signal).

Figure 7:
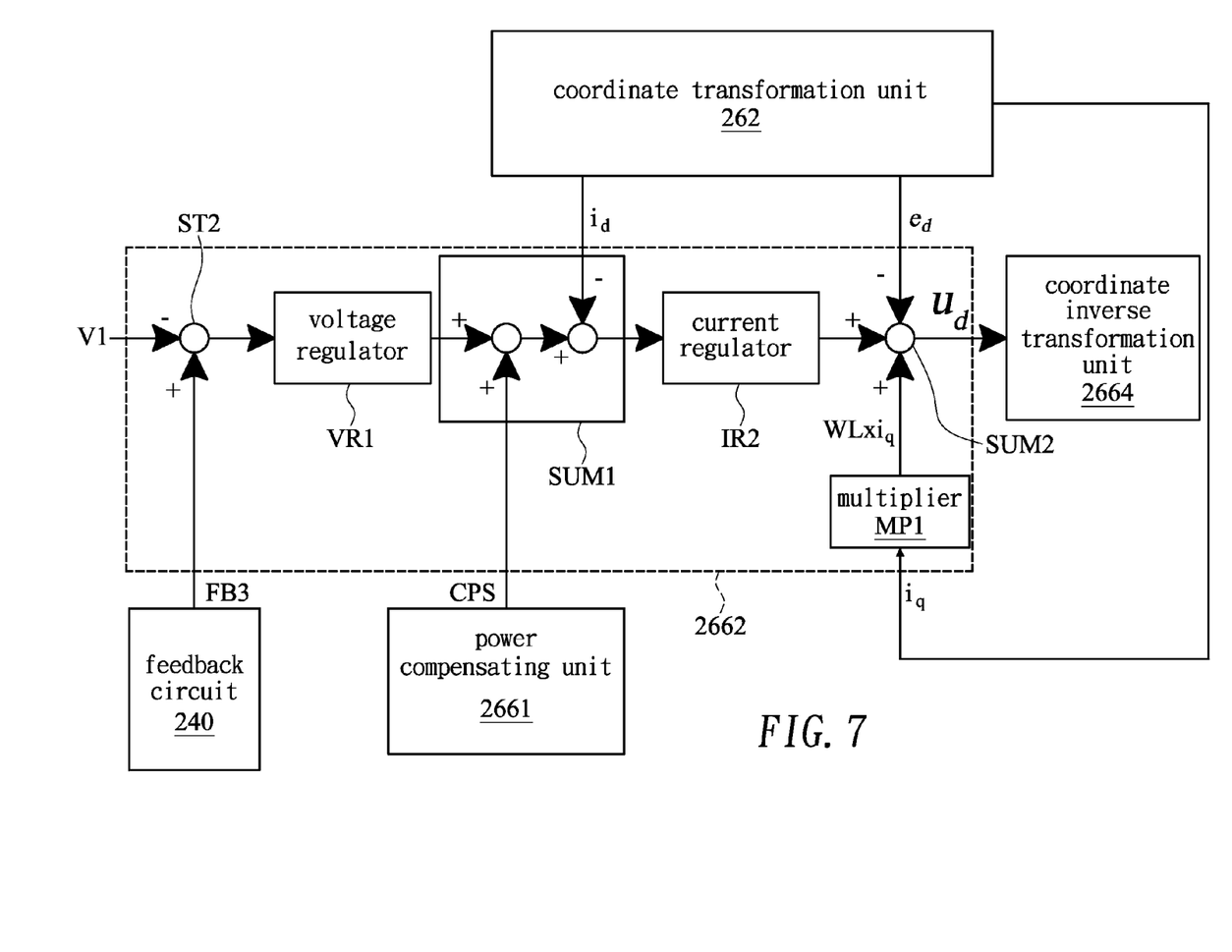
FIG. 7 is a rough structural schematic view of a d-axis controlling unit according to an embodiment of the present invention.

Referring to FIG. 7, there is shown a rough structural schematic view of the d-axis 2662 controlling unit according to an embodiment of the present invention.

As shown in FIG. 7, the d-axis controlling unit 2662 comprises a subtractor ST2, a voltage regulator VR1, a first accumulator SUM1, a current regulator IR2, a multiplier MP1, and a second accumulator SUM2.

The positive input end of the subtractor ST2 is electrically connected to the feedback circuit 240, and the negative input end of the subtractor ST2 is electrically connected to a second supplying unit (not shown). The voltage regulator VR1 is electrically connected between the output end of the subtractor ST2 and a first positive input end of the first accumulator SUM1. A second positive input end of the first accumulator SUM1 is electrically connected to the power compensating unit 2661. The negative input end of the first accumulator SUM1 is electrically connected to the coordinate transformation unit 262. The current regulator IR2 is electrically connected between the output end of the first accumulator SUM1 and a first positive input end of the second accumulator SUM2. The multiplier MP1 is electrically connected between the coordinate transformation unit 262 and a second positive input end of the second accumulator SUM2. The negative input end of the second accumulator SUM2 is electrically connected to the coordinate transformation unit 262, and the output end of the second accumulator SUM2 is electrically connected to the coordinate inverse transformation unit 2664.

The second supplying unit supplies a preset voltage command value V1 to the subtractor ST2. The subtractor ST2 calculates the difference between the voltage command value V1 and the third feedback signal FB3 from the feedback circuit 240, and sends the difference to the voltage regulator VR1. Afterward, the voltage regulator VR1 regulates an output value (i.e., the difference between the third feedback signal FB3 and the voltage command value V1) of the subtractor ST2, and sends the regulated output value to the first accumulator SUM1. The voltage regulator VR1 can amplify an error of the direct current link voltage (i.e., the output voltage of the DC-DC converter 210). The first accumulator SUM1 calculates the sum of an output value of the voltage regulator VR1 and the input compensation value CPS, subtracts the d-axis fourth feedback signal $i_d$ from the sum, and sends the difference to the current regulator IR2. Afterward, the current regulator IR2 regulates an output value (i.e., the amount that remains after the d-axis fourth feedback signal $i_d$ is subtracted from the sum of an output value of the voltage regulator VR1 and the input compensation value CPS) of the first accumulator SUM1, and sends the regulated value to the second accumulator SUM2. The current regulator IR2 can amplify an error of the d-axis fourth feedback signal. The multiplier MP1 increases in multifold the q-axis fourth feedback signal $i_q$ according to a predetermined multiplication rate (WL) and sends the q-axis fourth feedback signal WL×$i_q$ increased in multifold to the second accumulator SUM2. Afterward, the second accumulator SUM2 calculates the sum of an output value of the current regulator IR2 and an output value (WL×$i_q$) of the multiplier MP1, subtracts the d-axis fifth feedback signal $e_d$ from the sum, so as to generate and send the d-axis controlling command $\mu_d$ to the coordinate inverse transformation unit 2664.

Figure 8:
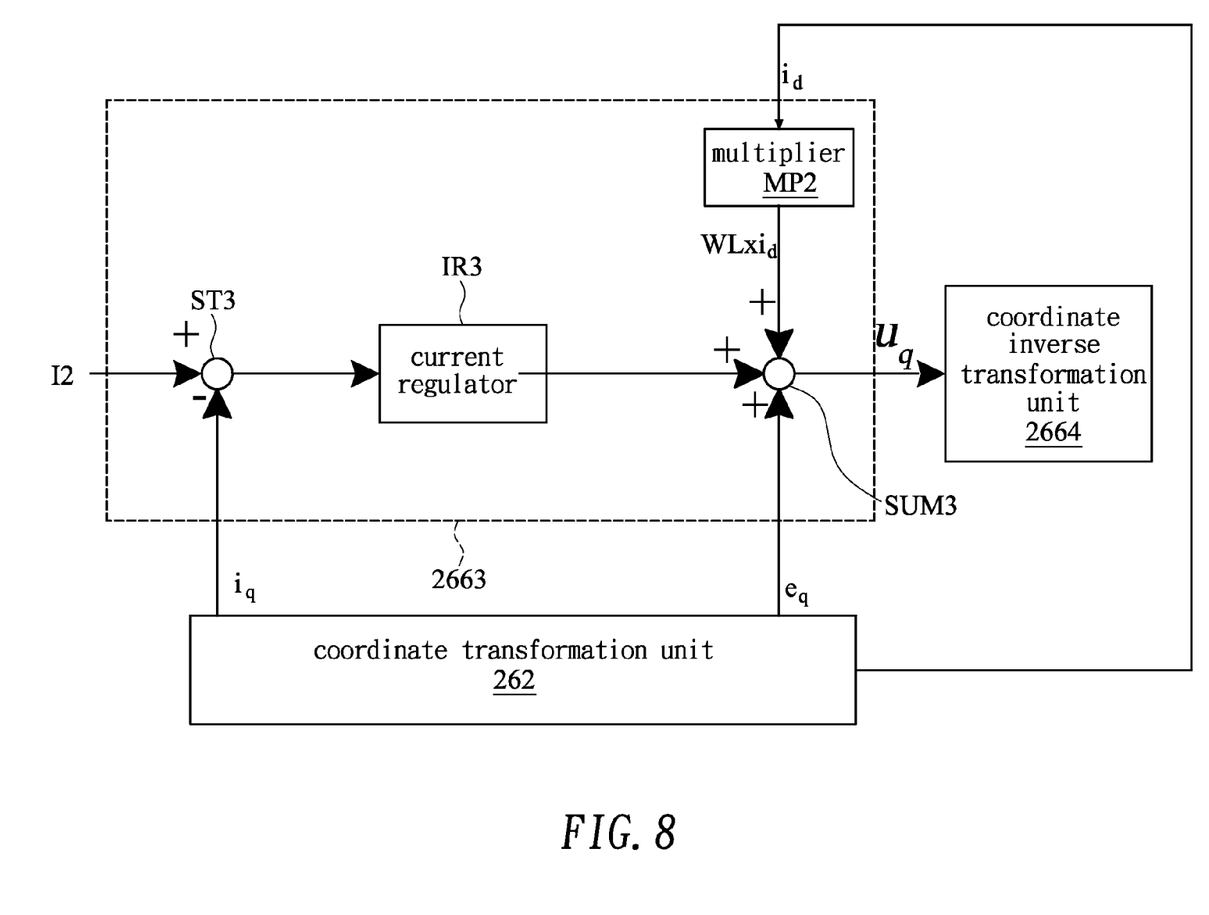
FIG. 8 is a rough structural schematic view of a q-axis controlling unit according to an embodiment of the present invention.

Referring to FIG. 8, there is shown a rough structural schematic view of the q-axis controlling unit 2663 according to an embodiment of the present invention.

Referring to FIG. 8, the q-axis controlling unit 2663 comprises a subtractor ST3, a current regulator IR3, a multiplier MP2, and a third accumulator SUM3.

The positive input end of the subtractor ST3 is electrically connected to a third supplying unit (not shown), and the negative input end of the subtractor ST3 is electrically connected to the coordinate transformation unit 262. The current regulator IR3 is electrically connected between the output end of the subtractor ST3 and a first positive input end of the third accumulator SUM3. The multiplier MP1 is electrically connected between the coordinate transformation unit 262 and a second positive input end of the third accumulator SUM3. Also, a third positive input end of the third accumulator SUM3 is electrically connected to the coordinate transformation unit 262, and the output end of the third accumulator SUM3 is electrically connected to the coordinate inverse transformation unit 2664.

The third supplying unit supplies a preset current command value I2 to the subtractor ST3. The subtractor ST3 calculates the difference between the q-axis fourth feedback signal $i_q$ from the coordinate transformation unit 262 and the current command value I2 and sends the difference to the current regulator IR3. Afterward, the current regulator IR3 regulates an output value (i.e., the difference between the current command value I2 and the q-axis fourth feedback signal $i_q$) of the subtractor ST3 and sends the regulated value to the third accumulator SUM3. The current regulator IR3 can amplify an error of the q-axis fourth feedback signal. The multiplier MP2 increases in multifold the d-axis fourth feedback signal $i_d$ according to a predetermined multiplication rate (WL) and sends the d-axis fourth feedback signal WL×$i_d$ increased in multifold to the third accumulator SUM3. Afterward, the third accumulator SUM3 calculates the sum of an output value of the current regulator IR3, an output value (WL×$i_d$) of the multiplier MP2, and the q-axis fifth feedback signal $e_q$, so as to generate and send the q-axis controlling command $\mu_q$ to the coordinate inverse transformation unit 2664.

In general, the current command value I2 is set to 0. Also, two said multipliers MP1, MP2 can use the same predetermined multiplication rate, and the predetermined multiplication rate (WL) can be the product of the angular frequency ($\omega_e$) of the grid power and a filter induction value ($L_f$).

Components of the control module 260 implements the aforesaid functions, respectively, by software programming so as to reduce the volume of the hardware circuit greatly.

The power conversion circuit according to an embodiment of the present invention is applicable to a grid-connected renewable power system. As regards control, a grid-connected renewable power system operates in a second-order series-connection mode (which means that renewable power generated by the renewable power supply 10 passes through the DC-DC converter 210 and then is series-connected to the first-order DC-AC inverter 220). As regards control of a system in its entirety, the DC-DC converter 210 of the power conversion circuit is controlled by a current closed circuit according to an embodiment of the present invention, and the level of power generation handled by the DC-DC converter 210 is controlled by feeding back the direct current link voltage, output current, and output voltage of the renewable power supply 10. As regards the DC-AC inverter 220 of the power conversion circuit according to an embodiment of the present invention, the direct current link voltage is controllably stabilized by feeding back the direct current link voltage. Problems with system control design can be reduced by d-q-axis coordinate transformation. The direct current link voltage is regulated by the power compensation control inputted such that, in response to an instantaneous change in the load 40, the direct current link voltage outputted is unlikely to undergo any great change, thereby enhancing the stability of the direct current link voltage. The angular position $\theta_e$ of the grid power voltage is detected, so as to ensure that the output voltage of the DC-AC inverter 220 can be synchronized with the grid power.

The foregoing embodiments are provided to illustrate the characteristics of the present invention so as to enable persons skilled in the art to understand the disclosure of the present invention and implement the present invention accordingly, and are not intended to be restrictive of the scope of the present invention. Hence, all equivalent modifications and changes made to the foregoing embodiments without departing from the spirit embodied in the disclosure of the present invention should fall within the scope of the present invention as set forth in the appended claims.

What is claimed is:

1. A power conversion circuit, comprising:
   a first receiving end electrically connected to a renewable power supply;
   a second receiving end for receiving a grid power;
   a load end for electrical connection with a load;
   a DC-DC converter having an input end electrically connected to the first receiving end to thereby convert output voltage of the renewable power supply into a stable direct current link voltage according to a duty cycle of a first modulation signal;
   a DC-AC inverter having an input end electrically connected to an output end of the DC-DC converter to thereby receive the direct current link voltage and convert the direct current link voltage into an alternating current link voltage according to a duty cycle of a second modulation signal;
   an output circuit electrically connected to an output end of the DC-AC inverter, the second receiving end, and the load end so as to supply one of the alternating current link voltage and the grid power to the load;
   a feedback circuit electrically connected to the first receiving end, the output end of the DC-DC converter, the output end of the DC-AC inverter, and the second receiving end so as to feed back a first feedback signal corresponding to the output voltage of the renewable power supply, a second feedback signal corresponding to an output current of the renewable power supply, a third feedback signal corresponding to the direct current link voltage of the DC-DC converter, a fourth feedback signal corresponding to an output current of the DC-AC inverter, and a fifth feedback signal corresponding to the output voltage of the grid power;
   a detecting circuit electrically connected to the feedback circuit for receiving the fifth feedback signal and performing computation according to the fifth feedback signal so as to obtain an angular position of the grid power;
   a control module electrically connected to the feedback circuit and the detecting circuit for converting expression of the fourth feedback signal and the fifth feedback signal in terms of two-axis stator coordinates into expression of the fourth feedback signal and the fifth feedback signal in terms of rotor coordinates according to the angular position, outputting a first control signal according to the first feedback signal, the second feedback signal, and the third feedback signal, and outputting a second control signal according to the first feedback signal, the second feedback signal, the third feedback signal, and the fourth feedback signal and the fifth feedback signal which are expressed in terms of the rotor coordinates; and
   a pulse width modulation regulator electrically connected to the control module for outputting the first modulation signal according to the first control signal and outputting the second modulation signal according to the second control signal.

2. The power conversion circuit of claim 1, wherein the detecting circuit comprises:
   a second order digital orthogonal converter electrically connected to the feedback circuit for receiving the fifth feedback signal and generating, according thereto, sine waves synchronized with the grid power; and
   an arctangent calculating unit electrically connected between the second order digital orthogonal converter and the control module for calculating the angular position of the grid power according to the sine waves synchronized with the grid power.

3. The power conversion circuit of claim 1, wherein the control module comprises:
   a coordinate transformation unit for converting expression of the fourth feedback signal and the fifth feedback signal in terms of two-axis stator coordinates into expression of the fourth feedback signal and the fifth feedback signal in terms of rotor coordinates according to the angular position;
   a first controller for outputting the first control signal according to the first feedback signal, the second feedback signal, and the third feedback signal; and
   a second controller for outputting the second control signal according to the first feedback signal, the second feedback signal, the third feedback signal, the fourth feedback signal and the fifth feedback signal which are expressed in terms of the rotor coordinates, and the angular position.

4. The power conversion circuit of claim 3, wherein the first controller comprises:
   a subtractor for calculating a difference between a current command value and the second feedback signal;
   a current regulator for regulating an output value of the subtractor;
   an accumulator for calculating a sum of an output value of the current regulator and the third feedback signal and then subtracting the first feedback signal from the sum; and
   a reciprocator for converting the third feedback signal into a reciprocal according to an output value of the accumulator, so as to generate the first control signal.

5. The power conversion circuit of claim 3, wherein the fifth feedback signal expressed in terms of the rotor coordinates comprises a q-axis fifth feedback signal and a d-axis fifth feedback signal, and the second controller comprises:
   a power compensating unit for generating an input compensation value according to the first feedback signal, the second feedback signal, and the d-axis fifth feedback signal;

a d-axis controlling unit for generating a d-axis controlling command according to the third feedback signal, the input compensation value, the fourth feedback signal expressed in terms of the rotor coordinates, and the d-axis fifth feedback signal;

a q-axis controlling unit for generating a q-axis controlling command according to the fourth feedback signal expressed in terms of the rotor coordinates and the q-axis fifth feedback signal;

a coordinate inverse transformation unit for converting expression of the d-axis controlling command and the q-axis controlling command in terms of the rotor coordinates into expression of the d-axis controlling command and the q-axis controlling command in terms of the two-axis stator coordinates according to the angular position, so as to generate a controlling command expressed in terms of the two-axis stator coordinates; and a computing unit for receiving the controlling command expressed in terms of the two-axis stator coordinates and performing computation according to the controlling command expressed in terms of the two-axis stator coordinates so as to generate the second control signal.

6. The power conversion circuit of claim 5, wherein the fourth feedback signal expressed in terms of the rotor coordinates comprises a q-axis fourth feedback signal and a d-axis fourth feedback signal, and the d-axis controlling unit comprises:

a subtractor for calculating a difference between the third feedback signal and a voltage command value;

a voltage regulator for regulating an output value of the subtractor;

a first accumulator for calculating a sum of an output value of the voltage regulator and the input compensation value and then subtracting the d-axis fourth feedback signal from the sum;

a current regulator for regulating an output value of the first accumulator;

a multiplier for increasing in multifold the q-axis fourth feedback signal according to a predetermined multiplication rate; and a second accumulator for calculating the sum of an output value of the current regulator and an output value of the multiplier and then subtracting the d-axis fifth feedback signal from the sum so as to generate the d-axis controlling command.

7. The power conversion circuit of claim 5, wherein the fourth feedback signal expressed in terms of the rotor coordinates comprises a q-axis fourth feedback signal and a d-axis fourth feedback signal, and the q-axis controlling unit comprises:

a subtractor for calculating a difference between a current command value and the q-axis fourth feedback signal;

a current regulator for regulating an output value of the subtractor;

a multiplier for increasing in multifold the d-axis fourth feedback signal according to a predetermined multiplication rate; and a third accumulator for calculating a sum of an output value of the current regulator, an output value of the multiplier, and the q-axis fifth feedback signal so as to generate the q-axis controlling command.

* * * * *